No. 746,740. PATENTED DEC. 15, 1903.
A. R. PRITCHARD.
FAUCET OR COCK.
APPLICATION FILED JUNE 20, 1903.
NO MODEL.
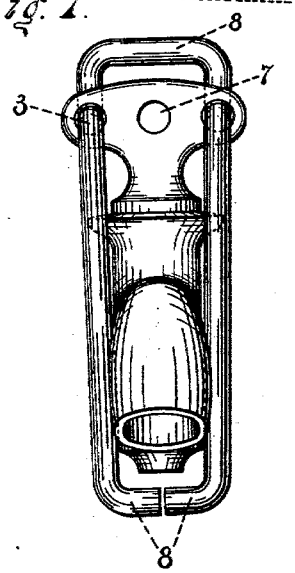
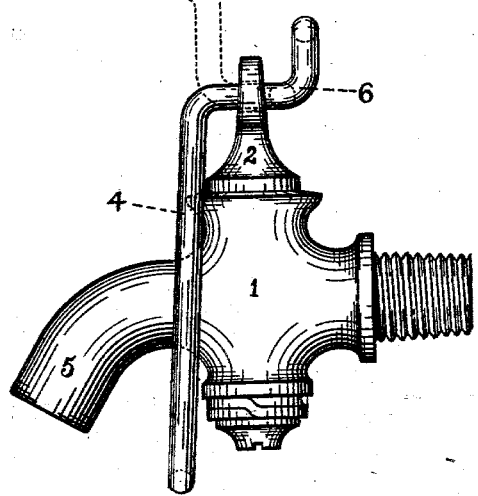

No. 746,740. Patented December 15, 1903.

UNITED STATES PATENT OFFICE.

ALBERT R. PRITCHARD, OF ROCHESTER, NEW YORK.

FAUCET OR COCK.

SPECIFICATION forming part of Letters Patent No. 746,740, dated December 15, 1903.

Application filed June 20, 1903. Serial No. 162,396. (No model.)

*To all whom it may concern:*

Be it known that I, ALBERT R. PRITCHARD, a citizen of the United States, and a resident of Rochester, in the county of Monroe and State of New York, have invented certain new and useful Improvements in Faucets or Cocks, of which the following is a specification.

This invention relates to faucets or cocks for controlling the flow of fluids, and has for its object to provide one that is adapted to lock when the plug is in a determined position.

In the drawings, Figure 1 is an end view, and Fig. 2 is a side view, of the faucet.

1 represents the main body of a faucet of ordinary construction. The head 2 of the plug is perforated on each side, as at 3 3. The plug is retained in a predetermined position by means of a swinging arm that is attached to the head 2 of the plug and adapted to engage with the nozzle. The faucet may be constructed either so that the passage through the faucet is closed or open when the said arm is in position to engage with the nozzle. The arm may be of any suitable shape and proportions. In the drawings it is represented as consisting of a wire link that is passed through the holes 3 3 in the head 2 of the plug and so shaped that it can be turned down over the nozzle 5 of the faucet and will remain in position when raised up out of engagement with said nozzle. The link is represented as bent at right angles to its main portion before passing through the holes 3 3 in the head 2 of the plug and then bent again at right angles into a plane parallel with its main portion. By drawing the link forward until the bend 6 is adjacent to the head 2 of the plug the link can be turned up into the position represented by the dotted lines in Fig. 2. When the link is in the position shown in full lines, the plug cannot be turned. The swinging arm or link is also represented as adapted to spring over the nozzle, so that it grips the nozzle firmly and cannot be shaken from it, for the ends 8 of the wire link are free and the width of the link normally somewhat less than the width of the nozzle.

The link can be locked down over the nozzle in the position shown in the drawings, if desired, by a padlock passed through the hole 7 and around the end of the link 8.

The link when turned up into the elevated position (shown by dotted lines in Fig. 2) will engage with the head of the plug, so that it is locked thereby in that position and affords a handle by which the plug can be turned.

What I claim is—

1. In a faucet or cock the combination with a faucet-body, of a plug therein having a projecting head; and a swinging link having a sliding connection with said head and adapted both to turn down over the nozzle of the faucet and to be locked in an elevated position by engagement with said head of the plug.

2. In a faucet or cock, the combination with a faucet-body, of a plug therein having a projecting head 2 perforated at 3 3; and a link 4 passing through said perforations, but at right angles to its main portion, and again into a plane parallel with its main portion; substantially as described.

ALBERT R. PRITCHARD.

Witnesses:
I. B. BUTLER,
C. S. DAVIS.